United States Patent [19]

Otey et al.

[11] 4,454,268

[45] Jun. 12, 1984

[54] STARCH-BASED SEMIPERMEABLE FILMS

[75] Inventors: Felix H. Otey; Richard P. Westhoff, both of Peoria, Ill.

[73] Assignee: The United States of America as represented by the Secretary of Agriculture, Washington, D.C.

[21] Appl. No.: 507,191

[22] Filed: Jun. 23, 1983

[51] Int. Cl.³ .............................................. C08L 3/02
[52] U.S. Cl. ...................................... 524/47; 524/52; 524/522; 524/556; 525/54.24; 525/54.26; 525/54.31; 523/128
[58] Field of Search .................. 524/47, 52, 522, 556; 525/54.24, 54.26, 54.31; 523/128

[56] References Cited

U.S. PATENT DOCUMENTS 3,992,496 11/1976 Matsunaga et al. .................. 524/52
4,133,784 1/1979 Otey et al. ............................. 524/52
4,337,181 6/1982 Otey et al. ........................... 523/128

Primary Examiner—John Kight, III
Assistant Examiner—Nathan M. Nutter
Attorney, Agent, or Firm—M. Howard Silverstein; David G. McConnell; Curtis P. Ribando

[57] ABSTRACT

Semipermeable films useful as dialysis membranes are prepared from starch-based composites. The films are shaped by conventional methods from a plasticized matrix comprising highly gelatinized starch and ethylene acrylic acid copolymer neutralized with a strong alkali. These films are remarkably transparent and resistant to degradation in the presence of aqueous solutions.

16 Claims, No Drawings

STARCH-BASED SEMIPERMEABLE FILMS

BACKGROUND OF THE INVENTION

1. Field of the Invention

While cellulose-based films have achieved prominence as semipermeable membranes, starch-based films have not been available that would withstand prolonged exposure to water. Starch and cellulose are high polymers composed of D-glucose units. Their molecules differ only in weight and in the manner in which the glucose units are joined together. Cellulose is a linear polysaccharide consisting of 6,000 to 8,000 1,4-linked β-D-glucose units. Because of this 1,4-β-linkage, these chain molecules can align themselves alongside each other to form linear crystals or microfibrils. These structural properties contribute to strong hydrogen bonding, film-forming capabilities, and high resistance to gelatinization in water. In contrast, most common starches contain 17–27% linear polysaccharide (amylose) consisting of 400 to 1,000 1,4-linked α-D-glucose units and the remaining composition is a branched molecule (amylopectin) having 10,000 to 40,000 1,4- and 1,6-linked α-D-glucose linkage. Because of the 1,4-α-linkage, the amylose molecules assume a spiral or helical shape having six glucose units per spiral. Starch readily disperses in hot water to form starch-pastes possessing unique viscosity characteristics and film-forming behavior. However, such films are very brittle upon drying and are very sensitive to water. This invention relates to certain starch-based formulations which yield durable semipermeable films having potential applications as dialyzing membranes.

2. Description of the Prior Art

In U.S. Pat. No. 4,337,181, Otey et al. teach the preparation of flexible, starch-based films which are water resistant, yet biodegradable. The films are formed by shaping a composite of a water-dispersible ethylene acrylic acid (EAA) copolymer and a starchy material by the methods of extrusion blowing, simple extrusion, or molding. The resultant products have disclosed utilities as agricultural mulch, as well as disposable packaging and bagging materials. In this procedure, gelatinized starch and EAA are combined in a plasticized matrix, and then the acidic portion of the EAA is at least partially neutralized with ammonia or an amine. It is by virtue of the neutralization and adjustment of the moisture content that the matrix can be extrusion blown. Films prepared by this process have no observed permeability properties.

SUMMARY OF THE INVENTION

It has now been surprisingly discovered that when starch-EAA formulations such as those of Otey et al., supra, are neutralized with a strong alkali as opposed to ammonia or an amine, it is possible to prepare films having semipermeable characteristics. These results are accomplished by converting to a plasticized matrix a mixture of highly gelatinized starch, EAA, and sufficient strong alkali to neutralize substantially all of the EAA. The matrix is thereafter shaped into a film by any method known in the art.

In accordance with this discovery, it is an object of the invention to prepare starch-containing semipermeable films useful as dialysis membranes.

It is also an object of the invention to prepare highly transparent, starch-based films which are resistant to degradation under conditions of dialysis.

It is a further object of the invention to tailor the permeability of the films of the invention to predetermined molecular sizes by controlling the formulation constituents.

Other objects and advantages of the invention will become readily apparent from the ensuing disclosure.

DETAILED DESCRIPTION OF THE INVENTION

"Films," such as those made in accordance with the invention, are defined by the polymer industry (Encyclopedia of Polymer Science and Technology, John Wiley & Sons, Inc., 1967, Vol. 6, page 764) as "shaped plastics that are comparatively thin in relation to their breadth and width and have a maximum thickness of 0.010 in." Self-supporting films are those capable of supporting their own weight. "Uniform films," as used in this application, refer to those which are virtually free of breaks, tears, holes, bubbles, and striations.

"Semipermeable membranes" are those films through which certain substances pass while others are retained. Typically, it is at the molecular level that such membranes are semipermeable.

"Composite" is defined herein in accordance with The American Heritage Dictionary of the English Language, New College Edition, published by Houghton Mifflin Company, page 27, to mean "a complex material . . . in which two of more distinct, structurally complementary substances, especially . . . polymers, combine to produce some structural or functional properties not present in any individual component."

The starch-based films of the invention are prepared from any unmodified starch from cereal grains or root crops such as corn, wheat, rice, potato, and tapioca, from the amylose and amylopectin components of starch, from modified starch products such as partially depolymerized starches and derivatized starches, and also from starch graft copolymers. The term "starchy materials" as used in the specification and in the claims is defined herein to include all starches, starch flours, starch components, and other starch products as described above. The term "starch-based" in reference to the products of the invention is used in the broad sense of containing a starchy material.

In the preparation of the instant starch-based films, the starchy materials must be highly gelatinized by the time of the shaping steps. By "highly" gelatinized, it is meant that all or substantially all of the starch granules are sufficiently swollen and disrupted that they form a smooth viscous dispersion in the water. Gelatinization is effected by any known procedure such as heating in the presence of water or an aqueous solution at temperatures of about 60° C. The presence of strong alkali is known to facilitate this process. The gelatinization may be carried out either before or after admixing the starchy material with the EAA as discussed further below.

The EAA copolymer must have sufficient carboxyl functionality so as to be compatible with the starch for purposes of preparing the disclosed films. It is believed that the pendant carboxyl groups supplied by the acylic acid component associate with the hydroxyl groups of the starch, thereby contributing to the compatibility and composite formation of the starch and the EAA. These carboxyl groups coincidentally contribute to the water dispersibility of the copolymer. We have found as a rule of thumb that if the EAA is water dispersible, it will also be sufficiently compatible with the starch.

The preferred EAA is a product prepared by copolymerizing a mixture comprising about 20% acrylic acid and 80% ethylene, by weight. However, it is to be understood that EAA copolymers having somewhat different proportions of polymerized acrylic acid and ethylene would also yield acceptable starch-based films provided that they contain a sufficient number of carboxyl groups to be water dispersible.

The strong alkali of choice for use in the invention is sodium hydroxide, though potassium hydroxide would also be effective. The amount added to the film compositions may be varied over a wide range so long as enough is initially present to equal at least one equivalent per equivalent of acid in the EAA. Normally, the level of alkali addition will be about 2 to 8 weight percent based on the dry weight of the starch-EAA formulation. The alkali cation is believed to form a salt with the acid as evidenced by the weight change observed upon soaking and redrying the film. Addition of an amount of alkali in excess of that required for neutralization insures that the starch attains an adequate degree of gelatinization.

On a dry weight basis, the starch:EAA ratio must be at least 20:80, and should not exceed about 60:40. The range is preferably from about 30:70 to about 50:50. Below ratios of 20:80, the permeability of the film to even the smallest of molecules becomes insignificant. At this level, we have found that only trace amounts of urea (MW 60) will pass through. As the starch:EAA ratio approaches 60:40, the degradation and tear resistances drop considerably, the film becomes translucent, and the other physical properties become fair to poor. Within the designated ratios, the proportions may be varied to tailor the films' permeability to the desired end-use. Permeability may also be controlled by selection of the starchy material type.

If the starch has been pregelatinized, its moisture content at the time of addition to the starting mixture is not particularly critical provided that enough moisture is available in the system to permit dispersing the EAA. If the added starch is granular, sufficient moisture must be provided to allow partial or complete gelatinization. Either way, during the initial mixing of the formulation components, at least 10-20% water based on total solids should be present. Excess moisture is then removed from the composition by evaporation during the subsequent processing operations.

In the preferred embodiment of the invention, the starch is gelatinized in the presence of the strong alkali during the mixing operation. The mixture should be heated sufficiently to simultaneously gelatinize the starch and melt the EAA, resulting in the formation of a plasticized matrix. With the aforementioned EAA copolymer comprising 20% acrylic and 80% ethylene, this can be accomplished at temperatures as low as 60° C., though the operation is more readily conducted at 95°-130° C.

Shaping of the matrix into the semipermeable films is most expeditiously achieved by means of extrusion blowing. The term "extrusion blowing" is well known in the art and distinguishes from simple extrusion in that it relates to shaping a tubular extrudate, or "bubble" into its form by internal and external cooling streams of air, the internal stream causing expansion of the bubble to several times the size of the die opening. Films prepared by this technique are commonly referred to as "blown films." By continuous feeding of the plasticized formulations of this invention into the blowing apparatus, uniform, continuous blown films can be readily obtained.

The moisture content of the film formulation just prior to and after blowing must be maintained within the range of about 2 to 10% (w/w) and preferably between 5 and 8%. Compositions with moisture contents outside of this range do not produce a uniform, continuous film.

A second stage of mixing at temperatures of 125°-145° C. is suitable for adjusting the moisture content to the appropriate level. Since the formulations are readily blown at these temperatures, further temperature adjustment is unnecessary. Of course, the gelatinization, mixing, moisture reduction, and film blowing could all be conducted in one continuous operation using commercial equipment with heating, mixing, venting, and extrusion blowing capability.

It is envisioned that the films could also be formed by other known methods to include simple extrusion, milling, and casting provided that the plasticized matrix is prepared accordingly. Typically, the formulations and preparatory steps for simple extrusion would be substantially the same as those set forth above. In casting, the EAA, starch, and alkali are dispersed in water in an amount of about 5-15 times the weight of the starch. Treatment in a high-shear blender accelerates dispersion. When heated, the resultant suspension is converted to a thin plasticized matrix which is readily cast and dried in a suitable manner. For purposes of milling, it is advisable to hold the moisture content to the minimal level required for gelatinization. The formulation of ingredients is passed through a conventional mill such as a rubber mill, and the resultant plasticized matrix is rolled into a thin sheet or film.

The product as produced by any of the aforementioned procedures is a flexible composite of the gelatinized starch and the EAA salt. Without desiring to be bound to any particular theory, it is believed that the EAA salt associates with the gelatinized starch molecules and holds them in the same expanded flexible state in which they exist in the heated matrix. The instant films are transparent.

As indicated by the relative diffusion rates of diverse molecules, these films have semipermeable properties useful in a variety of applications as known in the art. The absence of these properties in films produced by the process of Otey et al., supra, establishes the criticality of incorporating strong alkali into the formulation.

The films are prepared for use as dialyzing membranes by conditioning them in water or other suitable aqueous solution. During soaking, they imbibe a considerable amount of water, causing expansion and a leaching out of any excess alkali. When mounted in test dialysis cells in the presence of water, the expanded membranes tend to remain stable for several weeks with no apparent distortion or change in appearance.

Additives may be incorporated into the composites to alter their properties during preparation or in use. It was mentioned above that these films could be tailored for specific permeability characteristics by controlling the relative proportions of starch and EAA, as well as by the particular choice of starchy material. It is also possible to enhance permeability by incorporation of water-soluble additives which are leached out during the conditioning step. Many conventional plasticizers and other extractable materials as determined by the skilled artisan are suitable for this purpose. However, the principle by which their extraction from the membrane alters the permeability characteristics is not currently understood.

The following examples further illustrate the invention but should not be construed as limiting the invention which is defined by the claims.

All percents herein disclosed are "by weight" unless otherwise specified.

EXAMPLES 1–3

A. Film Preparation. A mixture of air-dried corn starch (11% moisture) and sodium hydroxide dissolved in an amount of water to provide 50% solids in the complete formulation were blended for 2–5 min. at 95°–100° C. in a steam-heated Readco mixer (type: 1-qt. lab made by Read Standard Div., Capitol Products Corp.) to gelatinize the starch. EAA pellets (type: 2375.33 manufactured by Dow Chemical Co.) were added while heating and mixing were continued. After the mixture was stirred and heated for a total of about 45 min., the resulting plasticized matrix was extrusion processed with an extrusion head attached to a Brabender Plasti-Corder (type: PL-V300, manufactured by C. W. Brabender Instruments, Inc., South Hackensack, N.J.). The screw of the extruder was ¾-in. in diameter, 9 in. long, and had a compression ratio of 2:1. The die consisted of 24 circular holes of 1/32-in. diameter. This extrusion process was repeated usually one or two more times until the moisture content of the exudate was between about 5 to 10%. This exudate was then blown into a film by passing it through the same extruder except that the die was replaced with a heated ½-in. blown film die. The barrel and die temperature ranged from 105°–110° C. As the level of starch was increased, extrusion blowing became increasingly more difficult until at about 60% the limits of the equipment were attained.

B. Semipermeability Analysis. Rotating dialysis cells were constructed from "Plexiglas" as follows: Each half of the cell was prepared by cutting a round 9.4-cm. diameter hole from a 0.6-cm. thick "Plexiglas" acrylic disc (13 cm. diameter), and this disc was then laminated to the same diameter "Plexiglas" disc that was 1.3-cm. thick. A "Plexiglas" rod (3.5 cm. diameter and 3 cm. long) was glued to the outside corner of each half for attaching the motor chuck. Two filling holes were drilled 180° C. apart on the edge of each compartment and provided with threaded plugs fitted with O-rings. Four-inch O-rings were fitted into grooves machined in the face of each compartment to seal the membranes clamped between the two halves.

The maximum available volume in each compartment was 46 cm.$^3$ and the area of exposed film, measured across contact with the large O-ring (100 mm. diameter) was 78.5 cm.$^2$ The entire measured area of the membrane was used to calculate observed permeabilities ($P_o$). Even though the cell is only partly filled, the diffusion process apparently continues due to a thin film of solution being carried over the arc above the solution during rotation of the cell.

Thickness of air-dried film specimens was measured at nine locations and reported as average thickness. The films were then soaked in water for several hours, and clamped, while wet, between the two cell halves. The cell was then attached to a motor chuck and the complete assembly positioned so that the axis of cell rotation was horizontal. A weighed syringe was used to introduce about 34 cm.$^3$ water into one side (B) and the same volume of solution into the other side (A). The filling holes were immediately plugged and the motor started. Since volumes A and B were essentially equal, $P_o$ was calculated from the following equation:

$$P_o = V \ln (\Delta C_o/\Delta C)/2At$$

where $\Delta C_o/\Delta C$ is the ratio of the concentration differences initially and at time t, A is the membrane area (78.5 cm.$^2$) through which transport took place, and V is the volume of liquids (about 34 cm.$^3$) in each side of the cell. Initial concentration, $C_o$, of each solute was 1.5% (w/w).

Diffusion rates of solutes through the membranes were followed by colorimetric analyses for the individual runs of urea and sugars. Sodium chloride concentrations were measured by atomic absorption analysis of sodium on a Varian Techtron AA120 spectrophotometer. The diffusivity of each of the tested solutes was individually determined. The results are reported in Table I, below.

EXAMPLE 4

The procedure of Examples 1–3 was repeated except that the corn starch was gelatinized in aqueous NaOH at 90° C., freeze dried, and then blended with the EAA and additional water to provide a formulation having 50% solids. The diffusivity of the sugars and alanine were simultaneously determined by introducing a mixed solution thereof [each at 1.5% (w/w)] to side A of the test cell. Solutions withdrawn from the cells at the conclusion of each run were analyzed by HPLC. The results are reported in Table I.

EXAMPLES 5–6

The procedure of Examples 1–3 was repeated except that water-soluble additives (20% ethylene glycol, Example 5; 2% glycerol and 6% glycol glucoside, Example 6) were blended into the mixture at the time of formulation, and in Example 5 the amount of water added with the NaOH provided a solids content of 77%. The diffusivity of the sugars and alanine were simultaneously determined as in Example 4. The results are reported in Table I.

EXAMPLES 7–10

The procedure of Example 1 was repeated except hydroxyethyl starch (a modified corn starch sold under the trade name "Amaizo 742D," American Maize Products Co.) was substituted for the unmodified corn starch. In Examples 8–10, various levels of sucrose were blended into the mixtures at the time of formulation. Diffusivity of the sugars and alanine were simultaneously determined as in Example 4. The results are reported in Table I.

EXAMPLES 11–16

The procedure of Example 1 was repeated except that starch graft copolymers were substituted for the unmodified corn starch. The copolymers were prepared by grafting either methyl methacrylate, methyl acrylate, or acrylonitrile onto corn starch by the procedure reported in Polym. Lett. 6: 599–602 (1968). Diffusivity of the sugars and alanine were simultaneously determined as in Example 4. The results are reported in Table I.

EXAMPLES 17-19

For purposes of comparison, the procedure of Example 1 was repeated except ammonia as ammonium hydroxide was substituted for the NaOH in the specified amounts.

film was especially pliable, uniform, and transparent. Diffusivity results were: sodium chloride, $P_o = 13.5 \times 10^{-6}$ and urea, $P_o = 24 \times 10^{-6}$ cm./sec.

EXAMPLE 22

The films prepared in accordance with Examples 2, 3,

TABLE I

| Example | Starchy material, %[a] | | EAA, %[a] | Additives, %[a] | | NaOH, p.p.h.[b] | Film thickness, mils | $P_o \times 10^6$ (cm./sec.) | | | | | | |
|---|---|---|---|---|---|---|---|---|---|---|---|---|---|---|
| | | | | | | | | NaCl | Urea | Glucose | Fructose | Sucrose | Raffinose | Alanine |
| 1 | starch, | 20 | 80 | ... | | 5 | 1.6 | ... | 0.01 | ... | ... | ... | ... | ... |
| 2 | starch, | 60 | 40 | ... | | 7.5 | 2.5 | 31.6 | 52.8 | 6.3 | 10 | 2.9 | 2.5 | ... |
| 3 | starch, | 40 | 60 | ... | | 5 | 1.9 | 7.2 | 12 | 1.5 | 1.1 | 0.4 | 0.08 | ... |
| 4 | starch, (freeze dried) | 40 | 60 | ... | | 5 | 1.5 | 5.1 | 17.5 | 0.9 | 1.2 | 0.6 | 0.1 | 2.4 |
| 5 | starch, | 30 | 50 | ethylene glycol, | 20 | 5 | 1.7 | 11.8 | 33.6 | 2.0 | 2.3 | 0.9 | 0.2 | 4.0 |
| 6 | starch, | 40 | 52 | glycerol, glycol glucoside, | 2 6 | 5 | 2.3 | ... | 21.6 | 4.1 | ... | 2.0 | 1.1 | ... |
| 7 | hydroxyethyl, | 40 | 60 | ... | | 5 | 1.2 | 4.6 | 20 | 1.0 | 1.1 | 0.4 | 0.1 | 2.2 |
| 8 | hydroxyethyl, | 40 | 50 | sucrose, | 10 | 5 | 1.9 | 8.7 | 37 | 0.8 | 1.0 | 0.4 | 0.1 | 1.9 |
| 9 | hydroxyethyl, | 40 | 40 | sucrose, | 20 | 5 | 2.2 | 20.4 | 66 | 4.8 | 5.5 | 2.6 | 1.2 | 4.3 |
| 10 | hydroxyethyl, | 40 | 30 | sucrose, | 30 | 5 | 1.9 | 34.7 | 112 | 5.1 | 5.7 | 2.6 | 1.3 | 6.5 |
| 11 | starch/methyl methacrylate, | 40/10 | 50 | ... | | 5 | 1.8 | 9.7 | 25.4 | 1.3 | 1.7 | 0.8 | 0.4 | 2.7 |
| 12 | starch/methyl methacrylate, | 40/20 | 40 | ... | | 5 | 3.1 | 5.1 | 15 | 0.3 | 0.4 | 0.3 | 0 | 1.1 |
| 13 | starch/methyl acrylate, | 40/10 | 50 | ... | | 5 | 2.5 | 20.8 | 88 | 3.7 | 4.2 | 1.7 | 0.6 | 6.1 |
| 14 | starch/methyl acrylate, | 40/20 | 40 | ... | | 5 | 1.9 | 11.1 | 34.7 | 4.4 | 5.2 | 2.7 | 1.4 | 6.8 |
| 15 | starch/acrylonitrile, | 40/10 | 50 | ... | | 5 | 1.3 | 11.1 | 30 | 1.5 | 1.8 | 0.7 | 0.3 | 3.2 |
| 16 | starch/acrylonitrile, | 40/20 | 40 | ... | | 5 | 2.2 | 11.2 | 26.0 | 0.8 | 1.0 | 0.7 | 0.3 | 2.2 |
| 17 | starch, | 20 | 80 | ... | | 0[c] | 0.8 | ... | 0 | 0 | 0 | 0 | 0 | 0 |
| 18 | starch, | 40 | 60 | ... | | 0[d] | 1.0 | ... | 0 | 0 | 0 | 0 | 0 | 0 |
| 19 | hydroxyethyl, | 40 | 60 | ... | | 0[d] | 1.9 | 0 | 0 | ... | ... | ... | ... | ... |

[a] All percents are expressed on a dry weight basis.
[b] P.p.h. is parts per hundred of starchy material plus EAA plus other additives, on a dry weight basis.
[c] Formulation was neutralized with 4.3 p.p.h. NH$_3$.
[d] Formulation was neutralized with 3.2 p.p.h. NH$_3$.

With respect to the NaOH incorporated at 5 p.p.h. in the preceding examples, the molar amount of NH$_3$ was 100% more for Example 17, and 50% more for Examples 18 and 19. In Example 19, the starchy material was the hydroxyethyl starch used in Examples 7-10. Diffusivity determination was conducted as in Example 4, except for Examples 17 and 18 in which the concentration of each solute tested was 2% (w/w).

EXAMPLE 20

The procedure of Examples 1-3 was repeated wherein the formulation on a dry basis was 40% starch, 20% water-soluble sucrose, 40% EAA, and 5 p.p.h. NaOH, and the diffusivity of 7.65% ethanol was determined and analyzed by gas chromatography. Diffusivity results were: sodium chloride, $P_o = 14.4 \times 10^{-6}$ cm./sec.; urea, $P_o = 26.7 \times 10^{-6}$ cm./sec.; and ethanol, $P_o = 17.9 \times 10^{-6}$ cm./sec.

EXAMPLE 21

The procedure of Examples 1-3 was repeated wherein the formulation on a dry basis was 40% starch, 15% urea, 45% EAA, and 5 p.p.h. NaOH. The resulting and 6 were subjected to wet and dry tensile measurements using an Instron. Thirty 0.635 cm. × 10 cm. strips were cut from each film. Ten were used for dry tensile and elongation measurements and the other 20 were soaked 4 hr. in water, after which excess water was removed by blotting lightly with paper towels. Ten of the soaked strips were used for wet tensile and elongation measurements. The effects of soaking were determined from the remaining 10 strips. All of the films expanded and imbibed a considerable amount of water as indicated by the weight increase. After the wet samples were taken to dryness, they were reweighed. Weight losses indicate that the sodium hydroxide, in excess of that needed to neutralize the 20% acrylic acid in the EAA, and the glycerol and glycol glucoside (Example 6) are extracted within 4 hr. The results are reported in Table II, below.

It is understood that the foregoing detailed description is given merely by way of illustration and that modification and variations may be made therein without departing from the spirit and scope of the invention.

TABLE II

| | Formulation[a] | | | Tensile strength, kg./cm.[2b] | | Elongation, %[c] | | Effect of water soaking[c] | | |
|---|---|---|---|---|---|---|---|---|---|---|
| Film | Starch, % | EAA, % | NaOH, p.p.h. | Dry | Wet | Dry | Wet | Length increase, % | Weight increase, % | Weight loss, % |
| Example 2 | 60 | 40 | 7.5 | 255 | 24.4 | 7.6 | 27.5 | 12.4 | 58.9 | 7.5 |
| Example 3 | 40 | 60 | 5 | 238 | 44.9 | 50.4 | 48.3 | 9.5 | 40.4 | 1.8 |

TABLE II-continued

| Film | Formulation[a] Starch, % | EAA, % | NaOH, p.p.h. | Tensile strength, kg./cm.²[b] Dry | Wet | Elongation, %[c] Dry | Wet | Effect of water soaking[c] Length increase, % | Weight increase, % | Weight loss, % |
|---|---|---|---|---|---|---|---|---|---|---|
| Example 6[d] | 40 | 52 | 5 | 198 | 44.5 | 35.1 | 45.0 | 8.4 | 33.8 | 8.7 |

[a]Based on dry weight exclusive of water. NaOH given in parts per 100 parts formulation.
[b]Values are average of 10 specimens. Wet strengths based on dry cross-sectional areas; all samples broke at jaws.
[c]Values are average of ten specimens.
[d]Contained 2% glycerol and 6% glycol glucoside.

We claim:

1. A method of preparing a semipermeable film comprising the following steps:
   a. converting a mixture comprising a starchy material (SM), an ethylene acrylic acid copolymer (EAA), and a strong alkali into a plasticized matrix, wherein the ratio of SM:EAA is in the range of 20:80 to about 60:40 parts on a dry weight basis, wherein the strong alkali is present in an amount sufficient to neutralize substantially all of the EAA, and wherein the starchy material in the plasticized matrix is highly gelatinized; and
   b. shaping said matrix into a film.

2. A method as described in claim 1 wherein said starchy material is selected from the group consisting of unmodified starches and flours.

3. A method as described in claim 1 wherein said starchy material is a starch graft copolymer.

4. A method as described in claim 1 wherein the ratio of SM:EAA is in the range of 30:70 to 50:50 parts on a dry weight basis.

5. A method as described in claim 1 wherein said strong alkali is sodium hydroxide.

6. A method as described in claim 5 wherein the conditions of converting said mixture to a plasticized matrix in step (a) are sufficient to effect gelatinization of said starchy material.

7. A method as described in claim 1 wherein prior to shaping, the moisture content of the plasticized matrix is adjusted to within the range of about 2–10% based on the dry weight of the matrix, and the matrix is shaped into a film by extrusion blowing.

8. A method as described in claim 1 wherein the mixture of step (a) further comprises a leachable additive.

9. A method as described in claim 8 wherein said leachable additive is water soluble and is leached from the film by presoaking the film in water prior to use.

10. A method as described in claim 9 wherein said leachable additive is urea.

11. A semipermeable film composition comprising a dry composite of highly gelatinized starchy material (SM) and a sodium or potassium salt of ethylene acrylic acid copolymer (EAA), wherein the ratio of SM:EAA copolymer salt is in the range of 20:80 to 60:40 parts on a dry weight basis.

12. A composition as described in claim 11 wherein said starchy material is selected from the group consisting of unmodified starches and flour.

13. A composition as described in claim 11 wherein said starchy material is a starch graft copolymer.

14. A composition as described in claim 11 wherein the ratio of SM:EAA copolymer salt is in the range of 30:70 to 50:50 parts on a dry weight basis.

15. A composition as described in claim 11 further comprising a leachable additive.

16. A composition as described in claim 11 wherein said leachable additive is water soluble.

* * * * *